US012694371B2

(12) United States Patent
Sankaranarayanasamy et al.

(10) Patent No.: US 12,694,371 B2
(45) Date of Patent: Jul. 28, 2026

(54) METHODS AND SYSTEMS FOR DYNAMIC RISKS COUNTERMEASURES IN COMPLEX NETWORKED SYSTEMS

(71) Applicant: HITACHI, Ltd., Tokyo (JP)

(72) Inventors: Malarvizhi Sankaranarayanasamy, Mountain View, CA (US); Pegah Mavaie, Santa Clara, CA (US); Neda Zarayeneh, Santa Clara, CA (US); Omanshu Thapliyal, Santa Clara, CA (US); Prasun Singh, San Jose, CA (US); Ravigopal Vennelakanti, San Jose, CA (US)

(73) Assignee: HITACHI, Ltd., Tokyo (JP)

( * ) Notice: Subject to any disclaimer, the term of this patent is extended or adjusted under 35 U.S.C. 154(b) by 61 days.

(21) Appl. No.: 18/980,872

(22) Filed: Dec. 13, 2024

(65) Prior Publication Data

US 2026/0170451 A1     Jun. 18, 2026

(51) Int. Cl.
*G06Q 10/087* (2023.01)
*G06Q 10/047* (2023.01)
*G06Q 10/0635* (2023.01)

(52) U.S. Cl.
CPC ......... *G06Q 10/087* (2013.01); *G06Q 10/047* (2013.01); *G06Q 10/0635* (2013.01)

(58) Field of Classification Search
CPC . G06Q 10/087; G06Q 10/047; G06Q 10/0635
See application file for complete search history.

(56) References Cited

U.S. PATENT DOCUMENTS

| | | |
|---|---|---|
| 11,216,456 B1 | 1/2022 | Motik et al. |
| 11,227,018 B2 | 1/2022 | Adinarayan et al. |
| 11,442,992 B1 | 9/2022 | Moon et al. |
| 2024/0160903 A1 * | 5/2024 | Fouse .................. G06N 3/0475 |
| 2024/0333765 A1 * | 10/2024 | McGrew .............. G06F 16/334 |

FOREIGN PATENT DOCUMENTS

WO     WO-2020055910 A1 *   3/2020   .......... B60W 60/001

OTHER PUBLICATIONS

Chen et al., "Interpretable patent recommendation with knowledge graph and deep learning," Scientific Reports, 2023, 15 pages.

* cited by examiner

*Primary Examiner* — A. Hunter Wilder
*Assistant Examiner* — Joseph M Mutschler
(74) *Attorney, Agent, or Firm* — PROCOPIO, CORY, HARGREAVES & SAVITCH LLP

(57)                ABSTRACT

Systems and methods described herein aid in solving several technical problems, including predicting possible risk conditions in large, complex networked infrastructure systems, such as constantly evolving electrical grid signaling datacenter infrastructure; generating countermeasures to find optimal solutions for maintaining operational levels in response to dynamic system states and internal/external risk expressions to avoid major operational losses; and providing real-time solutions for large graph systems with numerous components.

19 Claims, 10 Drawing Sheets

USE CASE 2: NETWORK CONSTRUCTION FOR INVENTORY REDISTRIBUTION
STEP 1: INFRASTRUCTURE ASSET INVENTORY
INPUT: LIST OF DATACENTER LOCATIONS, CURRENT INVENTORY LEVELS OF CRITICAL COMPONENTS AT EACH LOCATION
OUTPUT: A COMPREHENSIVE INVENTORY OF ALL CRITICAL COMPONENTS ACROSS THE DATACENTERS

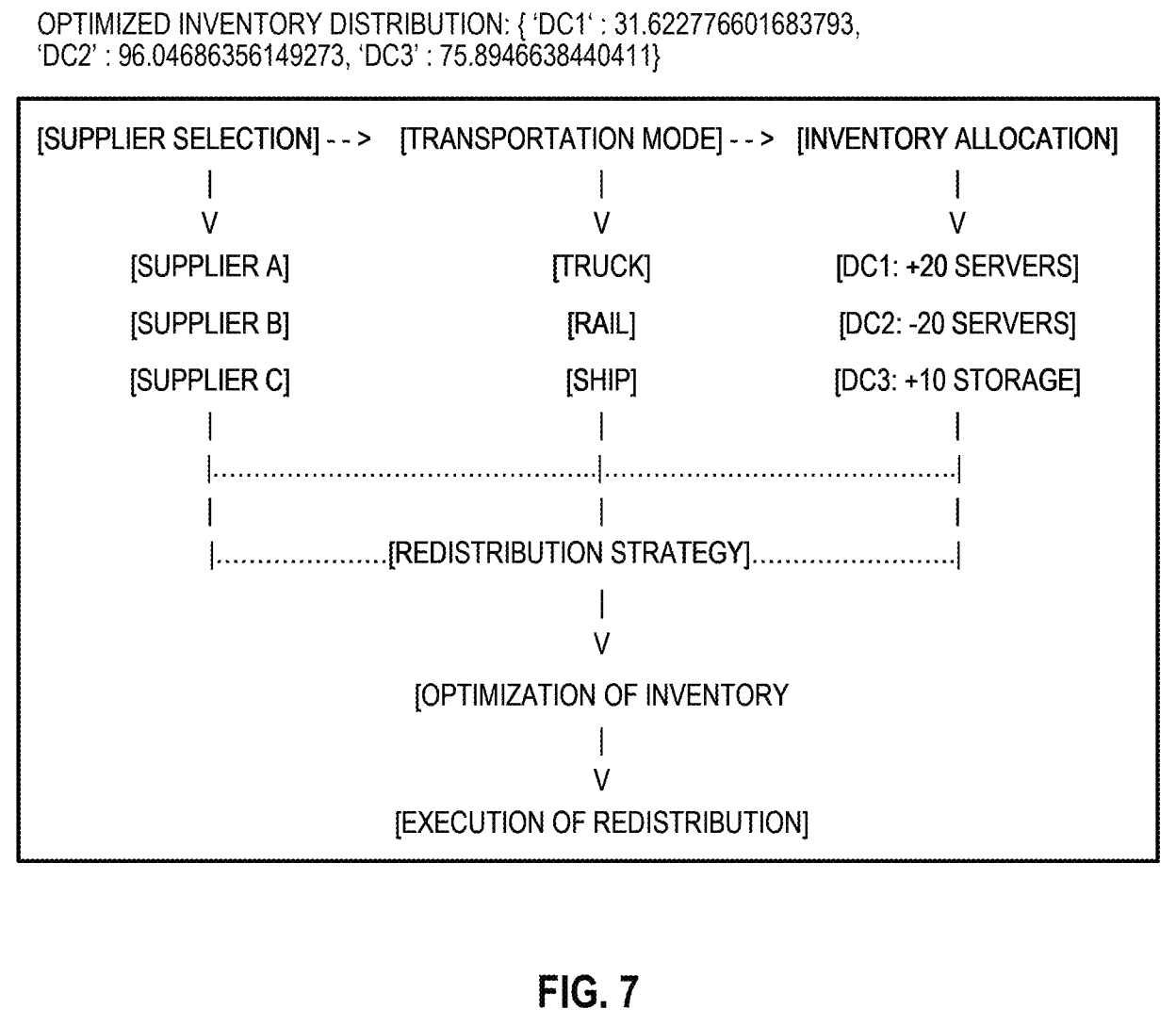

OPTIMIZED INVENTORY DISTRIBUTION: {'DC1' : 31.622776601683793,
'DC2' : 96.04686356149273, 'DC3' : 75.89466384440411}

[SUPPLIER SELECTION] - - >    [TRANSPORTATION MODE] - - >    [INVENTORY ALLOCATION]

|                              |                              |
V                              V                              V

[SUPPLIER A]                   [TRUCK]                        [DC1: +20 SERVERS]

[SUPPLIER B]                   [RAIL]                         [DC2: -20 SERVERS]

[SUPPLIER C]                   [SHIP]                         [DC3: +10 STORAGE]

[.....................[REDISTRIBUTION STRATEGY].....................]

|
V

[OPTIMIZATION OF INVENTORY

|
V

[EXECUTION OF REDISTRIBUTION]

FIG. 7

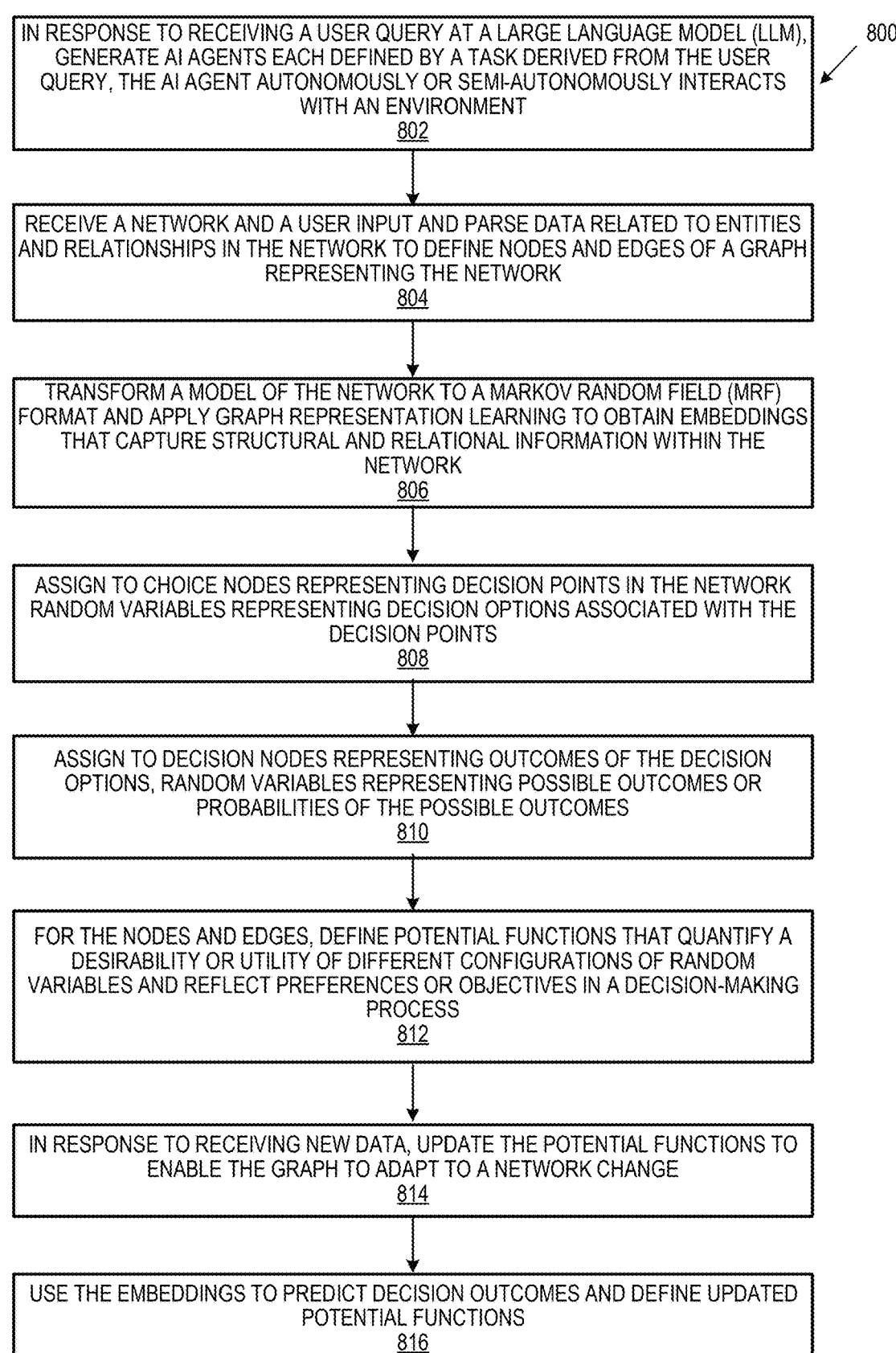

800

IN RESPONSE TO RECEIVING A USER QUERY AT A LARGE LANGUAGE MODEL (LLM), GENERATE AI AGENTS EACH DEFINED BY A TASK DERIVED FROM THE USER QUERY, THE AI AGENT AUTONOMOUSLY OR SEMI-AUTONOMOUSLY INTERACTS WITH AN ENVIRONMENT
802

RECEIVE A NETWORK AND A USER INPUT AND PARSE DATA RELATED TO ENTITIES AND RELATIONSHIPS IN THE NETWORK TO DEFINE NODES AND EDGES OF A GRAPH REPRESENTING THE NETWORK
804

TRANSFORM A MODEL OF THE NETWORK TO A MARKOV RANDOM FIELD (MRF) FORMAT AND APPLY GRAPH REPRESENTATION LEARNING TO OBTAIN EMBEDDINGS THAT CAPTURE STRUCTURAL AND RELATIONAL INFORMATION WITHIN THE NETWORK
806

ASSIGN TO CHOICE NODES REPRESENTING DECISION POINTS IN THE NETWORK RANDOM VARIABLES REPRESENTING DECISION OPTIONS ASSOCIATED WITH THE DECISION POINTS
808

ASSIGN TO DECISION NODES REPRESENTING OUTCOMES OF THE DECISION OPTIONS, RANDOM VARIABLES REPRESENTING POSSIBLE OUTCOMES OR PROBABILITIES OF THE POSSIBLE OUTCOMES
810

FOR THE NODES AND EDGES, DEFINE POTENTIAL FUNCTIONS THAT QUANTIFY A DESIRABILITY OR UTILITY OF DIFFERENT CONFIGURATIONS OF RANDOM VARIABLES AND REFLECT PREFERENCES OR OBJECTIVES IN A DECISION-MAKING PROCESS
812

IN RESPONSE TO RECEIVING NEW DATA, UPDATE THE POTENTIAL FUNCTIONS TO ENABLE THE GRAPH TO ADAPT TO A NETWORK CHANGE
814

USE THE EMBEDDINGS TO PREDICT DECISION OUTCOMES AND DEFINE UPDATED POTENTIAL FUNCTIONS
816

FIG. 8

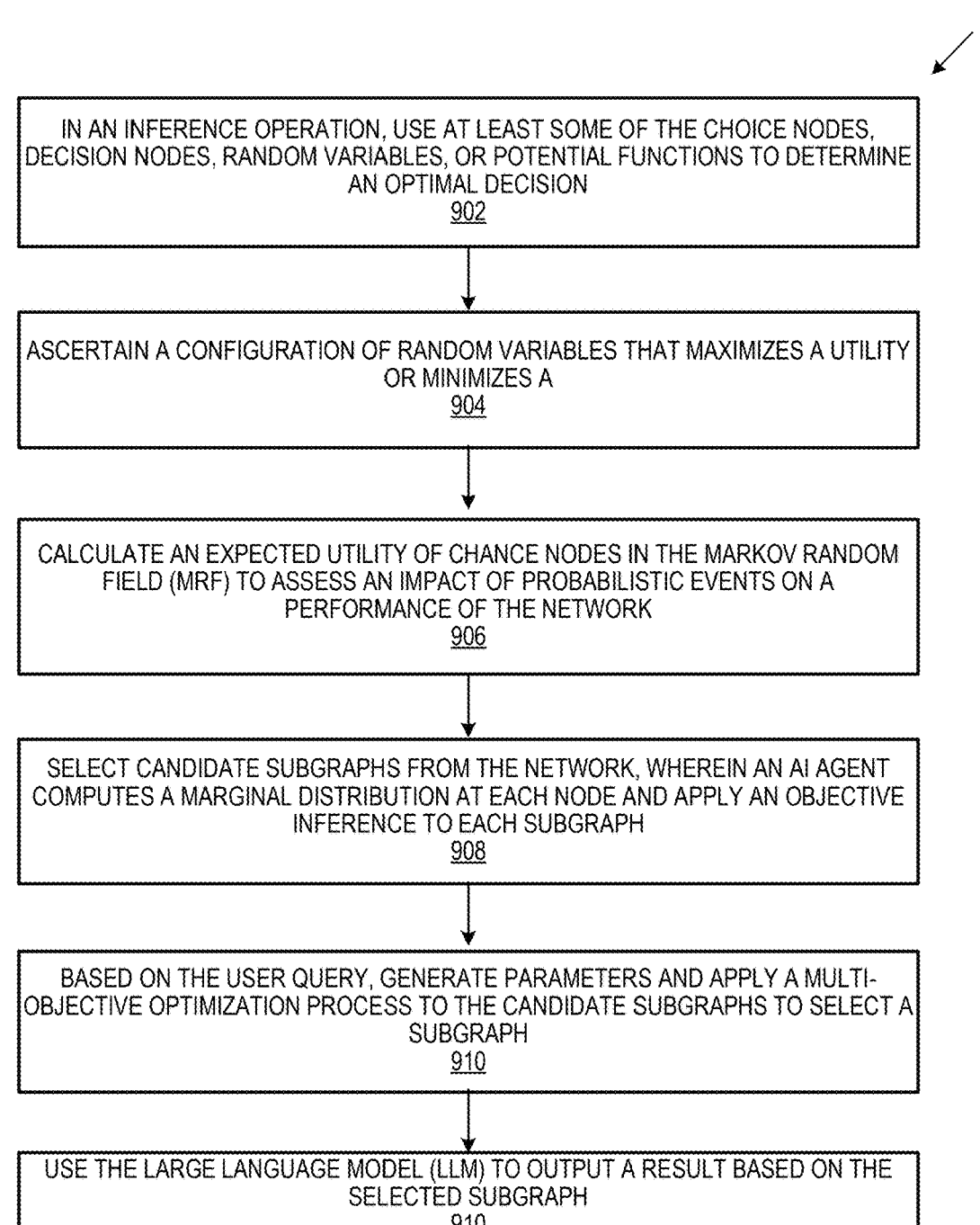

900

IN AN INFERENCE OPERATION, USE AT LEAST SOME OF THE CHOICE NODES, DECISION NODES, RANDOM VARIABLES, OR POTENTIAL FUNCTIONS TO DETERMINE AN OPTIMAL DECISION
902

ASCERTAIN A CONFIGURATION OF RANDOM VARIABLES THAT MAXIMIZES A UTILITY OR MINIMIZES A
904

CALCULATE AN EXPECTED UTILITY OF CHANCE NODES IN THE MARKOV RANDOM FIELD (MRF) TO ASSESS AN IMPACT OF PROBABILISTIC EVENTS ON A PERFORMANCE OF THE NETWORK
906

SELECT CANDIDATE SUBGRAPHS FROM THE NETWORK, WHEREIN AN AI AGENT COMPUTES A MARGINAL DISTRIBUTION AT EACH NODE AND APPLY AN OBJECTIVE INFERENCE TO EACH SUBGRAPH
908

BASED ON THE USER QUERY, GENERATE PARAMETERS AND APPLY A MULTI-OBJECTIVE OPTIMIZATION PROCESS TO THE CANDIDATE SUBGRAPHS TO SELECT A SUBGRAPH
910

USE THE LARGE LANGUAGE MODEL (LLM) TO OUTPUT A RESULT BASED ON THE SELECTED SUBGRAPH
910

METHODS AND SYSTEMS FOR DYNAMIC RISKS COUNTERMEASURES IN COMPLEX NETWORKED SYSTEMS

BACKGROUND

Field

The present disclosure is generally directed to networked systems and methods, and more specifically, to dynamic risks countermeasures for complex networked systems.

Related Art

Systems and methods herein assess system dependability in real-time using generative language models for graph reasoning to generate countermeasures in response to failures or possible risks. Various embodiments accomplish this by dynamically rearranging graphs and estimating recovery paths based on current system configurations under specific conditions or risk scenarios. The technology may be applied to any complex system of physical resources that is structured in a network fashion, adapting to changes in its operational environment-a concept fundamental in modern infrastructure and logistics, where efficiency, adaptability, and interconnectivity are key. Example networks include supply chain networks, power utilities, and other operational networks involving resources conditioned by dynamic demand.

To address uncertainties and adapt to changing scenarios, such networks typically implement a dynamic network approach with non-deterministic features that represent risk and system reliability. As demand forecasts fluctuate over time, algorithms can reoptimize resource allocation to maintain efficiency, which involves considering scenarios where characteristics of the network, such as demand, capacity, or cost vary over time.

Various embodiments address dynamic changes in networks, which may otherwise lead to risks or failures, by using custom AI agents that execute sequential tasks in predefined flows to obtain a recovery network configuration. Exemplary applications include (1) engineering or design teams, facility managers, procurement or supply chain, or sales teams adjusting capacity to accommodate demand uncertainties in datacenters; (2) transportation operators, such as asset managers, maintenance, or procurement teams, aiming to increase reliability of railway or similar traffic signaling systems; and (3) theme park operators keeping park rides on schedule.

Existing approaches focus on knowledge graph (KG)-oriented structures and KG query optimization using reasoning engines and deep learning methods or constructing relatively simple graphs, e.g., by integrating graph representation learning (GRL) and large language models (LLMs).

In contrast, systems and methods herein query, update, and provide system state information using autonomous task-based agents. These agents comprise predefined structures for executing graph reasoning, representation learning, and task optimization. In addition, embodiments utilize a modified version on Markov random fields (MRFs) to optimize a potential function to maximize expected returns, i.e., at the system performance level, even in worst-case scenarios.

These embodiments solve several technical problems, including (1) predicting possible risk conditions in large, complex networked infrastructure systems (large graph systems), such as constantly evolving electrical grid, railway signaling, datacenter infrastructure; (2) generating countermeasures to find optimal solutions for maintaining operational levels in response to dynamic system states and internal/external risk expressions to avoid major operational losses; and (3) providing real-time solutions for large graph systems with numerous components.

SUMMARY

In some aspects of the disclosure, a method for dynamically generating countermeasures for complex networked systems comprises: in an initialization phase, in response to receiving a user query at an LLM, generating AI agents each defined by a task derived from the user query, wherein each AI agent autonomously or semi-autonomously interacts with a control or data abstraction system, such as a supervisory control and data acquisition system, an energy management system, or a building management system, by performing steps including: in response to receiving a network and a user input, parsing data related to entities and relationships in the network to define nodes and edges of a graph representing the network; transforming a model of the network to an MRF format; applying graph representation learning to obtain embeddings that capture structural and relational information within the network; assigning to choice nodes, which represent decision points in the network, random variables that represent decision options associated with the decision points; assigning to decision nodes, which represent outcomes of the decision options, random variables that represent possible outcomes or probabilities of the possible outcomes; for the nodes and edges, defining potential functions, which quantify a desirability or utility of different configurations of one or more random variables and reflect preferences or objectives in a decision-making process; in response to receiving new data, updating the potential functions to enable the graph to adapt to a change in a network of systems; using the embeddings to predict decision outcomes and define updated potential functions; in an inference operation, performing steps including: using the at least some of the choice nodes, decision nodes, random variables, or potential functions to determine an optimal decision; finding a configuration of random variables that maximizes a utility or minimizes a cost; calculating an expected utility of chance nodes in the MRF to assess an impact of probabilistic events on a performance of the network; selecting candidate subgraphs from the network, wherein at least one AI agent computes a marginal distribution at each node and applying an objective inference to each subgraph; and based on the user query, generating parameters and applying a multi-objective optimization process to the candidate subgraphs to select a subgraph; and using the LLM to output a result based on the selected subgraph.

Some aspects further comprise performing at least one or a what-if risk analysis or a risk condition simulation. Some aspects further comprise fine-tuning a model of the network that represents a physical network and using the network to customize an interpreter based on system-specific documents and data sources.

Some aspects further comprise using sensor data to update the network model and/or using at least one of a graph pruning technique to reduce a complexity of one or more graphs, a restoration optimizing technique, or a community resilience technique.

Some aspects further comprise using one or more predefined task-based AI agents to automatically construct a joint probability distribution over the random variables in the network, the joint probability distribution being time-dependent and reflecting a dynamic network condition.

In some aspects, the parameters include at least one of a cost or a time associated with inventory levels at different locations, the parameters being based on current demand estimates.

In some aspects, the initialization phase further includes at least one of validating a task completion and logging execution steps.

Some aspects further comprise generating a set of recovery objectives associated with at least one of a cost, a time, or a system-based parameter.

In some aspects, the embeddings capture temporal changes in the network.

In some aspects, the potential functions are associated with both deterministic and probabilistic risk factors.

In some aspects, the AI agent uses historical data to assign probabilities to random variables.

Some aspects further comprise using an objective optimization process to select an optimal solution from a multi-objective optimization and/or updating the graph based on the new data to enable continuous learning and adaptation and/or integrating with a domain-specific system to enable a real-time data update.

In some aspects, the system generates a candidate recovery network for at least one of a deterministic risk scenario or a probabilistic risk scenario.

Some aspects involve a non-transitory computer-readable medium for storing instructions for executing a process that comprise: in an initialization phase, in response to receiving a user query at an LLM, generating AI agents each defined by a task derived from the user query, wherein each AI agent autonomously or semi-autonomously interacts with an environment by performing steps including: in response to receiving a network and a user input, parsing data related to entities and relationships in the network to define nodes and edges of a graph representing the network; transforming a model of the network to an MRF format; applying graph representation learning to obtain embeddings that capture structural and relational information within the network; assigning to choice nodes, which represent decision points in the network, random variables that represent decision options associated with the decision points; assigning to decision nodes, which represent outcomes of the decision options, random variables that represent possible outcomes or probabilities of the possible outcomes; for the nodes and edges, defining potential functions, which quantify a desirability or utility of different configurations of one or more random variables and reflect preferences or objectives in a decision-making process; in response to receiving new data, updating the potential functions to enable the graph to adapt to a change in a network of systems; using the embeddings to predict decision outcomes and define updated potential functions; in an inference operation, performing steps including: using the at least some of the choice nodes, decision nodes, random variables, or potential functions to determine an optimal decision; finding a configuration of random variables that maximizes a utility or minimizes a cost; calculating an expected utility of chance nodes in the MRF to assess an impact of probabilistic events on a performance of the network; selecting candidate subgraphs from the network, wherein at least one AI agent computes a marginal distribution at each node and applying an objective inference to each subgraph; and based on the user query, generating parameters and applying a multi-objective optimization process to the candidate subgraphs to select a subgraph; and using the LLM to output a result based on the selected subgraph.

In some aspects, an apparatus comprises one or more processors configured to: in an initialization phase, in response to receiving a user query at an LLM, generate AI agents each defined by a task derived from the user query, wherein each AI agent autonomously or semi-autonomously interacts with an environment and performs steps including: in response to receiving a network and a user input, parsing data related to entities and relationships in the network to define nodes and edges of a graph representing the network; transforming a model of the network to an MRF format; applying graph representation learning to obtain embeddings that capture structural and relational information within the network; assigning to choice nodes, which represent decision points in the network, random variables that represent decision options associated with the decision points; assigning to decision nodes, which represent outcomes of the decision options, random variables that represent possible outcomes or probabilities of the possible outcomes; for the nodes and edges, defining potential functions, which quantify a desirability or utility of different configurations of one or more random variables and reflect preferences or objectives in a decision-making process; in response to receiving new data, updating the potential functions to enable the graph to adapt to a change in a network of systems; using the embeddings to predict decision outcomes and define updated potential functions; and in an inference operation, perform steps including: using the at least some of the choice nodes, decision nodes, random variables, or potential functions to determine an optimal decision; finding a configuration of random variables that maximizes a utility or minimizes a cost; calculating an expected utility of chance nodes in the MRF to assess an impact of probabilistic events on a performance of the network; selecting candidate subgraphs from the network, wherein at least one AI agent computes a marginal distribution at each node and applying an objective inference to each subgraph; and based on the user query, generating parameters and applying a multi-objective optimization process to the candidate subgraphs to select a subgraph; and using the LLM to output a result based on the selected subgraph.

Aspects of the present disclosure can involve a system, which can involve means for performing steps comprising, in an initialization phase, in response to receiving a user query at an LLM, generating AI agents each defined by a task derived from the user query, wherein each AI agent autonomously or semi-autonomously interacts with an environment; means for performing steps comprising: in response to receiving a network and a user input, parsing data related to entities and relationships in the network to define nodes and edges of a graph representing the network; transforming a model of the network to an MRF format; means for applying graph representation learning to obtain embeddings that capture structural and relational information within the network; means for assigning to choice nodes, which represent decision points in the network, random variables that represent decision options associated with the decision points; means for assigning to decision nodes, which represent outcomes of the decision options, random variables that represent possible outcomes or probabilities of the possible outcomes; means for, defining, for the nodes and edges, potential functions, which quantify a desirability or utility of different configurations of one or more random variables and reflect preferences or objectives in a decision-making process; means for, in response to receiving new data, updating the potential functions to enable the graph to adapt to a change in a network of systems; using the embeddings to predict decision outcomes and define updated potential functions.

Aspects of the present disclosure can involve a system, which can involve means for performing steps comprising, in an inference operation, performing steps including: using the at least some of the choice nodes, decision nodes, random variables, or potential functions to determine an optimal decision; means for finding a configuration of random variables that maximizes a utility or minimizes a cost; means for calculating an expected utility of chance nodes in the MRF to assess an impact of probabilistic events on a performance of the network; means for selecting candidate subgraphs from the network, wherein at least one AI agent computes a marginal distribution at each node and applying an objective inference to each subgraph; and means for, generating, based on the user query, parameters and applying a multi-objective optimization process to the candidate subgraphs to select a subgraph; and mean for using the LLM to output a result based on the selected subgraph.

BRIEF DESCRIPTION OF DRAWINGS

FIG. 7 depicts a sample recovery network recommended by an exemplary network, according to various embodiments of the present disclosure.

FIG. 8 is a flowchart illustrating an initialization phase of an exemplary process for dynamically generating countermeasures for complex networked systems in accordance with various embodiments of the present disclosure.

FIG. 9 is a flowchart illustrating an inference phase of an exemplary process for dynamically generating countermeasures for complex networked systems in accordance with various embodiments of the present disclosure.

DETAILED DESCRIPTION

Figure 1:
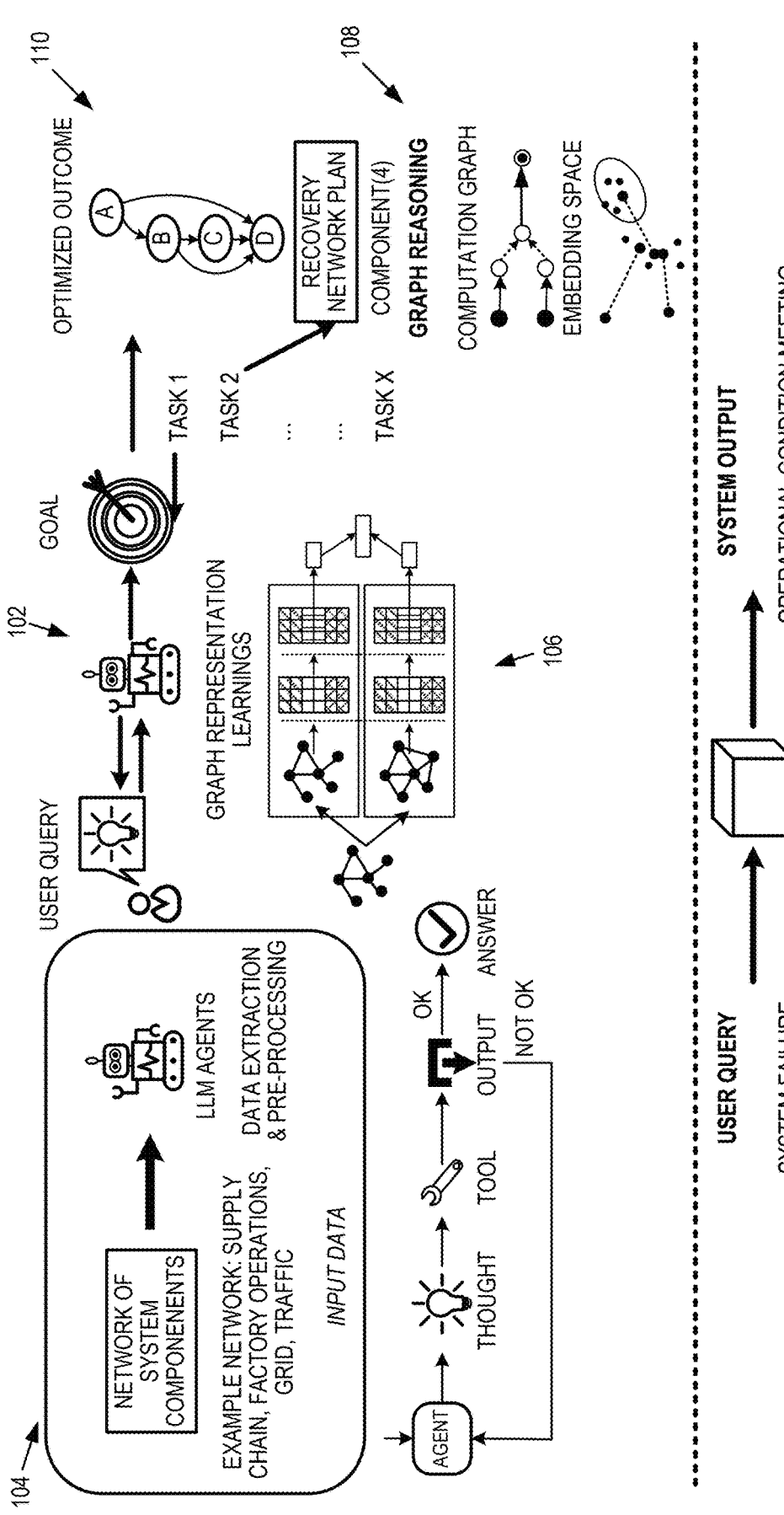
FIG. 1 illustrates an overview of a system, according to various embodiments of the present disclosure.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an overview of a system, according to various embodiments of the present disclosure. As depicted, system 100 comprises five components: first component 102 that performs initialization steps; second component 104 that performs steps such as collecting and arranging relevant information; third component 106 that reasons over graphs and performs representation learning; fourth component 108 that generates possible recovery graphs and minimizes risk; and fifth component 110 that performs steps related to recovery objectives and a recovery network.

In embodiments, component 102 performs initialization by performing steps comprising (1) generating a task list based on a user query from system simulation conditions using a personalized interpreter and generative natural language model; (2) deploying AI agents and assign tasks to them; (3) defining tasks, including generating objective functions, constraints, and termination conditions based on system states; (4) conducting intermediate verifications and reconciliations [to the system states] to ensure that the agents execute tasks specific to the current system state; and (5) validating task completion and log execution steps.

In embodiments, component 104 collects and arranges relevant information from a base network, documents, and system components, such as sensors, live documents, maps, etc. Component 104 may generate and transform an analysis network to Markov random fields (MRFs) having appropriate state expressions. If the foundational network is expressed as other probabilistic graph networks, such as Bayesian networks, component 104 may transform it to an MRF format, e.g., based on moralization principles encoded in task definitions. AI agents may reason and update various network features based on input from current or specified performance states of system components.

In embodiments, component 106 may reason over graphs and perform representation learning to establish graphs and potential functions for processing. For example, component 106 may do so based on a user query, and another set of agents may reason over graphs to establish MRF nodes and edges of interest, e.g., by using MRFs for decision-making under uncertainty and probabilistic inference. In embodiment, nodes in an MRF may be defined as either decision nodes that represent points where active choices are made (e.g., selecting a supplier or choosing a transportation route) or chance nodes that represent probabilistic events in the supply chain (e.g., supplier failure or transportation delays). Component 106 may use predefined AI agents for GRL to acquire embeddings of these nodes to capture complex relationships and interactions in the network. AI agents may use graph reasoning to assign meaningful random variables to nodes and edges by considering learned embeddings and roles of entities in the network. For example, when considering inventory redistribution based on dynamic demand, random variables may be assigned to nodes that represent the inventory levels at each location. These variables may be dynamic, changing over time based on demand signals. Edges may have random variables that represent a transportation capacity or reliability between locations. Further, AI agents may define potential functions that reflect learned relationships and dependencies. For instance, if learned embeddings indicate a strong connection between two suppliers, a suitable potential function may be designed such as to reflect a higher probability of simultaneous operation or failure.

In embodiments, component 108 may generate possible recovery graphs and minimize risk by providing automated construction of a joint probability distribution over all random variables in the network using predefined task-based AI agents. The distribution may be time-dependent such as to reflect the dynamic nature of network like dynamic demand expression, power cost, etc. The potential functions may be updated as new data comes in, allowing the model to adapt to changes.

Further, since the complexity of inference algorithms oftentimes scales with the size of the graph, optimization for large graphs may involve graph pruning according to any pruning technique known in the art.

In embodiments, component 110 may perform step related to recovery objectives and a recovery network, including generating candidate recovery networks for various risk expressions (deterministic and probabilistic) based on risk minimization principles. AI agents may generate a set of recovery objectives, considering recovery cost, time touch points, and other system parameters. The recovery objectives may be computed for the candidates and the optimal one may be selected from the multi-objective Pareto front of network performance scoring. In embodiments, to implement this approach, a combination of AI modeling techniques (e.g., natural language processing for data parsing, graph neural networks for representation learning), software engineering (for system integration and data management), and domain expertise (to define the objectives and constraints of the decision-making process) may be employed.

Figure 2:
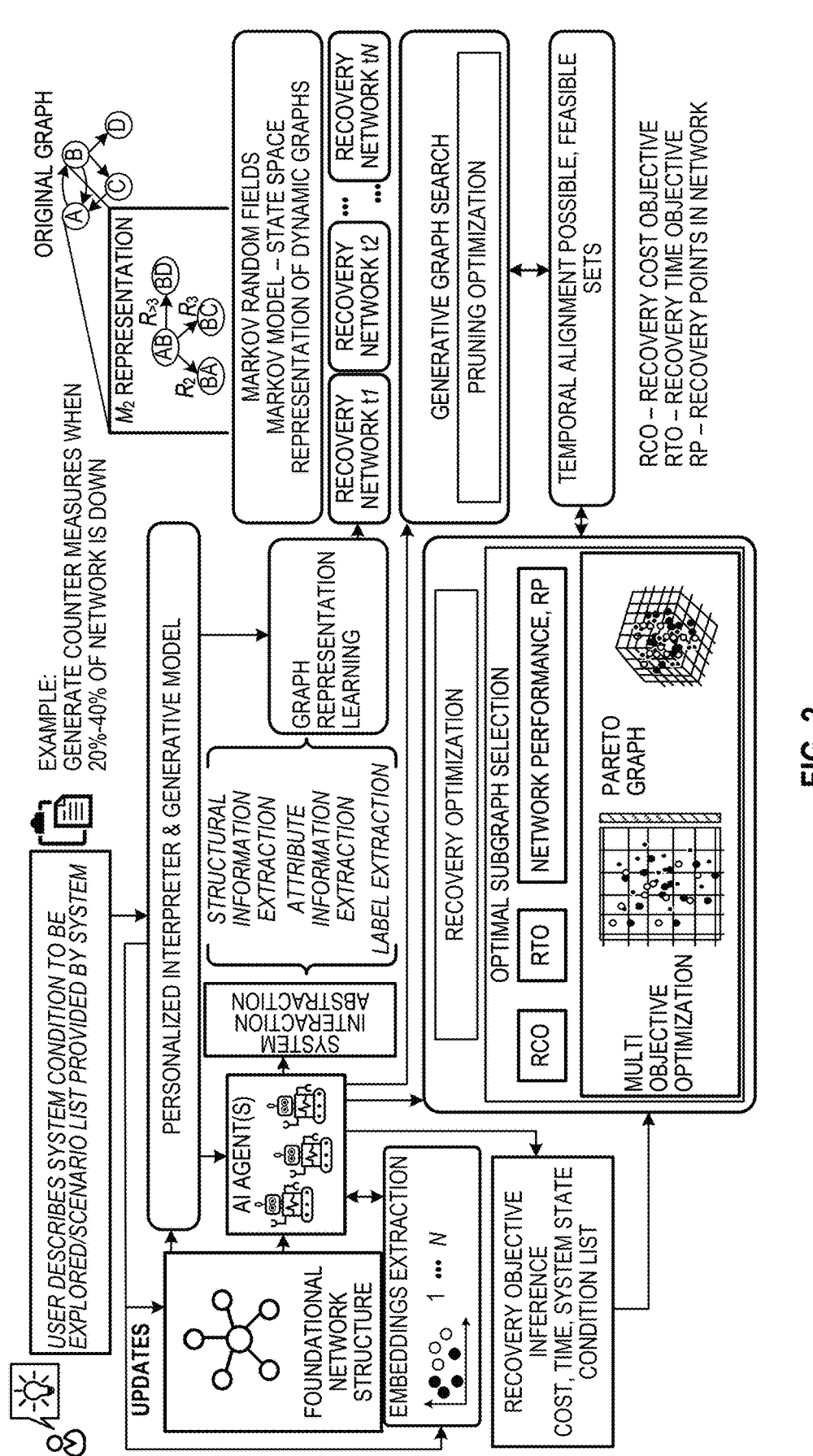
FIG. 2 illustrates an exemplary of system flow according to various embodiments of the present disclosure.

FIG. 2 is an exemplary system flow that illustrates an implementation of steps performed by the system components shown in FIG. 1. In embodiments, an initialization step may comprise receiving, at a conversational interface, user input, e.g., in the form of a high-level query, to preform what-if risk analysis or simulated risk conditions. Foundational network and model fine-tuning personalize system 200 based on associated documents and data sources.

Figure 3:
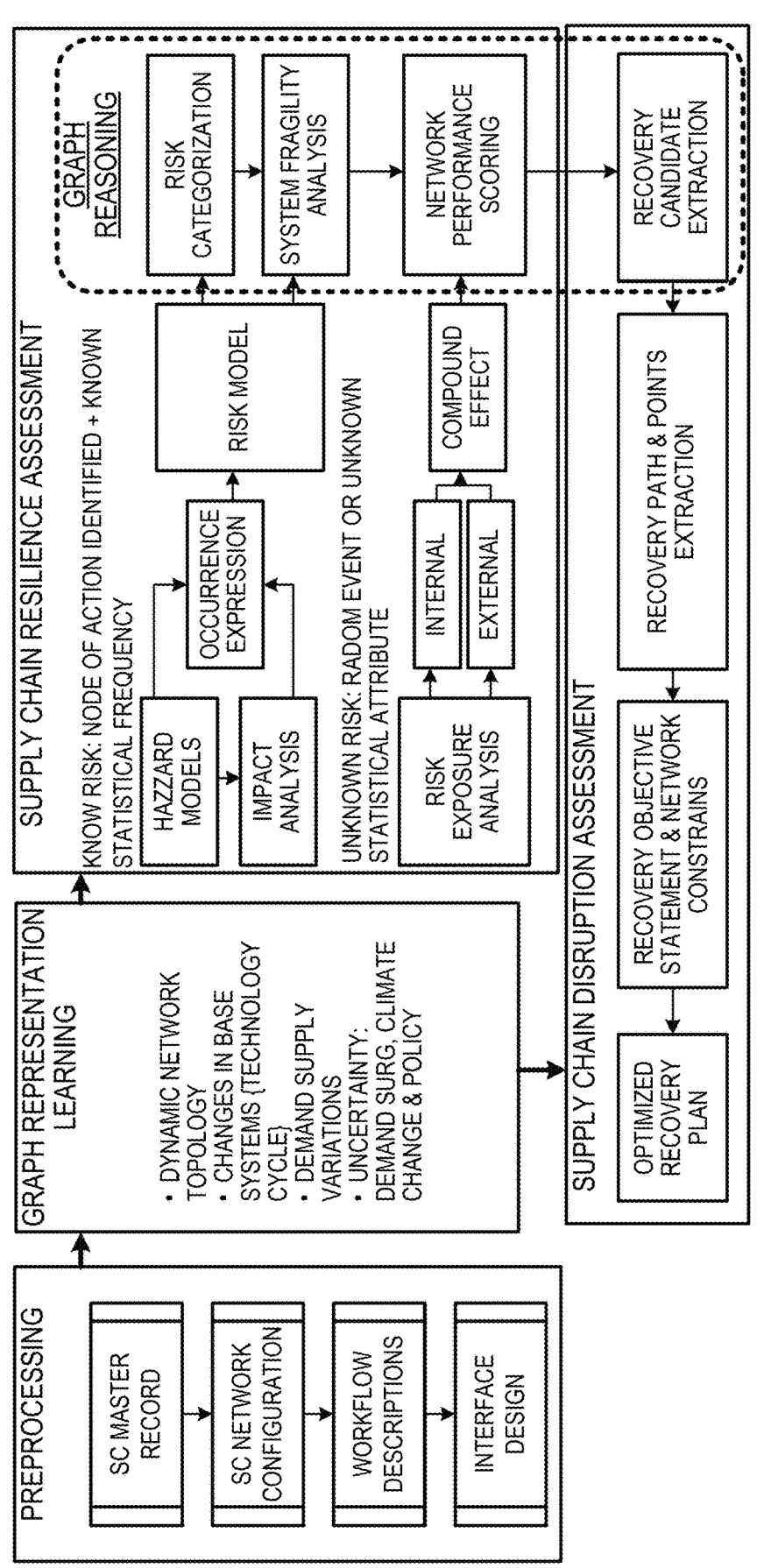
FIG. 3 illustrates an exemplary of an AI agent task flow according to various embodiments of the present disclosure.

FIG. 3 illustrates an exemplary AI agent task flow according to various embodiments of the present disclosure. In embodiments, one or more AI agents comprising task definitions or micro-programs may be deployed using LLMs. These AI agents may interact autonomously or semi-autonomously with their environments to perform a wide range of tasks. Implemented as sophisticated programs that may perform a variety of tasks, optionally with human assistance, by leveraging the capabilities of LLMs to understand and interact with both digital and physical environments. Various embodiments employ task-oriented agents whose task definitions derive from user queries or system task lists. Flow 300 enables the processing of various inputs, such as images or audio files and, thus, facilitates capabilities in different domains.

Figure 4:
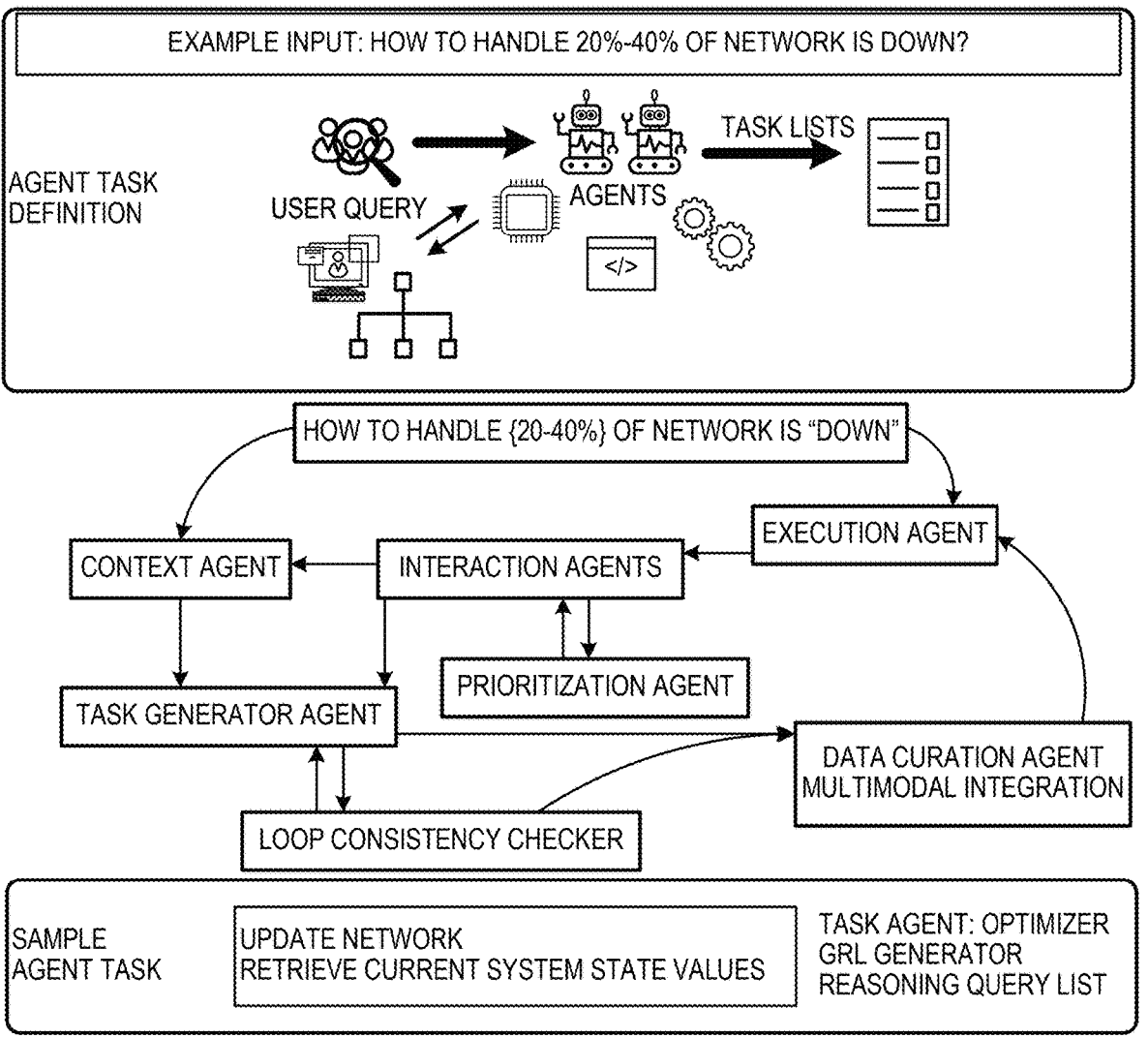
FIG. 4 illustrates an exemplary an AI agent execution process, according to various embodiments of the present disclosure.

FIG. 4 illustrates an exemplary AI agent execution process according to various embodiments of the present disclosure. In embodiments, in a graph construction or transformation step, an AI agent may construct a graph representation of a network (e.g., a supply chain or infrastructure network) by parsing data related to the network's entities and relationships, creating nodes and edges of a network.

Once the agents are defined according to their tasks, a foundational network may be adapted for future processing (shown in the pre-processing section in FIG. 2). This may involve a graph reasoning agent that maps the foundational network to an MRF format. For example, if the original network construct is in the form of hierarchical relationships in a Bayesian Network (BN) format, an agent may be defined to execute the pseudocode in Table 1 to transform it into MRF format.

TABLE 1

```
Process: Convert Bayesian Network to Markov Random Field
Input: A Bayesian Network with nodes N and directed edges
Output: A Markov Random Field with undirected edges
Procedure CONVERT_BN_TO_MRF(BN)
   MRF ← CREATE_EMPTY_GRAPH( )
   FOR each node n in N DO
      ADD_NODE(MRF, n)
   END FOR
   FOR each edge (u, v) in E DO
      ADD_UNDIRECTED_EDGE(MRF, u, v)
   END FOR
   FOR each node n in N DO
      PARENTS ← GET_PARENTS(BN, n)
      FOR each pair of nodes (u, v) in PARENTS DO
         IF NOT EDGE_EXISTS(MRF, u, v) THEN
            ADD_UNDIRECTED_EDGE(MRF, u, v)
         END IF
      END FOR
   END FOR
   RETURN MRF
END PROCEDURE
Procedure ADD_UNDIRECTED_EDGE(Graph, Node1, Node2)
   ADD_EDGE(Graph, Node1, Node2)
   ADD_EDGE(Graph, Node2, Node1)
END PROCEDURE
Procedure ADD_EDGE(Graph, Source, Target)
   IF NOT EDGE_EXISTS(Graph. Source, Target) THEN
      INSERT EDGE(Graph, Source, Target)
   END IF
END PROCEDURE
Procedure EDGE_EXISTS(Graph, Node1, Node2)
   RETURN EXISTS_EDGE(Graph, Node1, Node2)
END PROCEDURE
Procedure GET_PARENTS(BN, Node)
   RETURN LIST_OF_PARENTS(BN, Node)
END PROCEDURE
Procedure CREATE_EMPTY_GRAPH( )
   RETURN NEW_EMPTY_GRAPH( )
END PROCEDURE
```

Data curation and execution agents may provide relevant information for graph reasoning and GRL structures that provide the context. Nodes in MRFs used for probabilistic modeling in supply chain networks typically represent random variables associated with the state of entities within the network, such as whether a supplier is operational or disrupted. Edges represent dependencies or relationships between these entities. To integrate decision-making into the MRF framework embodiments utilize choice nodes, decision nodes, random variables, and potential functions, as discussed next.

In embodiments, GRL learns embeddings for entities in a supply chain network that represents different options available to a decision-maker. For example, embeddings may capture the importance of different suppliers or transportation methods, which may then be used as features to inform the selection process. Graph reasoning may be applied to predict outcomes of decisions made at the choice nodes. For instance, after learning the network's structure and dependencies, graph reasoning may aid in estimating the likelihood of successful delivery or delays based on a chosen transportation method. GRL may determine probabilities associated with different choices, e.g., by analyzing historical data and learning associated patterns of success and failure. These probabilities may then be assigned as random variables to both choice nodes and decision nodes in the MRF framework. Graph reasoning may be used to define potential functions that reflect learned relationships and dependencies between entities in the graph. These functions may capture the utilities or preferences associated with different decisions (e.g., supplier selection) and the probabilities of different outcomes (e.g., on-time delivery).

In embodiments, to enable an AI agent, such as an LLM, to perform tasks related to defining choice nodes, decision nodes, random variables, and potential functions with graph reasoning and representation learning, the AI agent may apply a GRL process to learn embeddings for each node in the graph to capture the structural and relational information within the network. Table 2 shows an exemplary process for converting a network into MRF format.

TABLE 2

```
Process for Convert Bayesian Network to Markov Random Field
Input: A Bayesian Network SN with a set of nodes N and a set
of directed edges E
Output: A Markov Random Field MRF with a set of nodes N and a set
of undirected edges E'
procedure CONVERT_BN_TO_MRF(BN)
    N ← GET_NODES(BN)
    E ← GET_EDGES(BN)
    MRF ← CREATE_EMPTY_GRAPH( )
    for each node n in N do
        ADD_NODE(MRF, n)
    end for
    for each edge (u, v) in E do
        ADD_UNDIRECTED_EDGE(MRF, u, v)
    end for
    for each node n in N do
        PARENTS ← GET_PARENTS(BN, n)
        for each pair (u, v) in PARENTS do
            ADD_UNDIRECTED_EDGE(MRF, u, v)
        end for
    end for
    REMOVE_DUPLICATE_EDGES(MRF)
    return MRF
end procedure
procedure ADD_NODE(Graph, Node)
    // Adds a node to the graph
end procedure
procedure ADD_UNDIRECTED_EDGE(Graph, Node1, Node2)
    // Adds an undirected edge between Node1 and Node2 in the graph
end procedure
procedure GET_NODES(BN)
    // Returns the set of nodes in the Bayesian Network
end procedure
procedure GET_EDGES(BN)
    // Returns the set of directed edges in the Bayesian Network
end procedure
procedure GET_PARENTS(BN, Node)
    // Returns the set of parents for a given node in the Bayesian Network
end procedure
procedure REMOVE_DUPLICATE_EDGES(Graph)
    // Removes duplicate edges from the graph
end procedure
```

In embodiments, the AI agent may identify and define choice nodes, which represent decision points in the network (e.g., selecting suppliers or routes). The AI agent may further identify decision nodes, which represent the outcomes of those decisions (e.g., successful delivery, delay). Then the AI agent may assign random variables to the nodes, where the variables for choice nodes may represent decision options and their associated probabilities, and variables for decision nodes represent possible outcomes and their probabilities.

Figure 5:
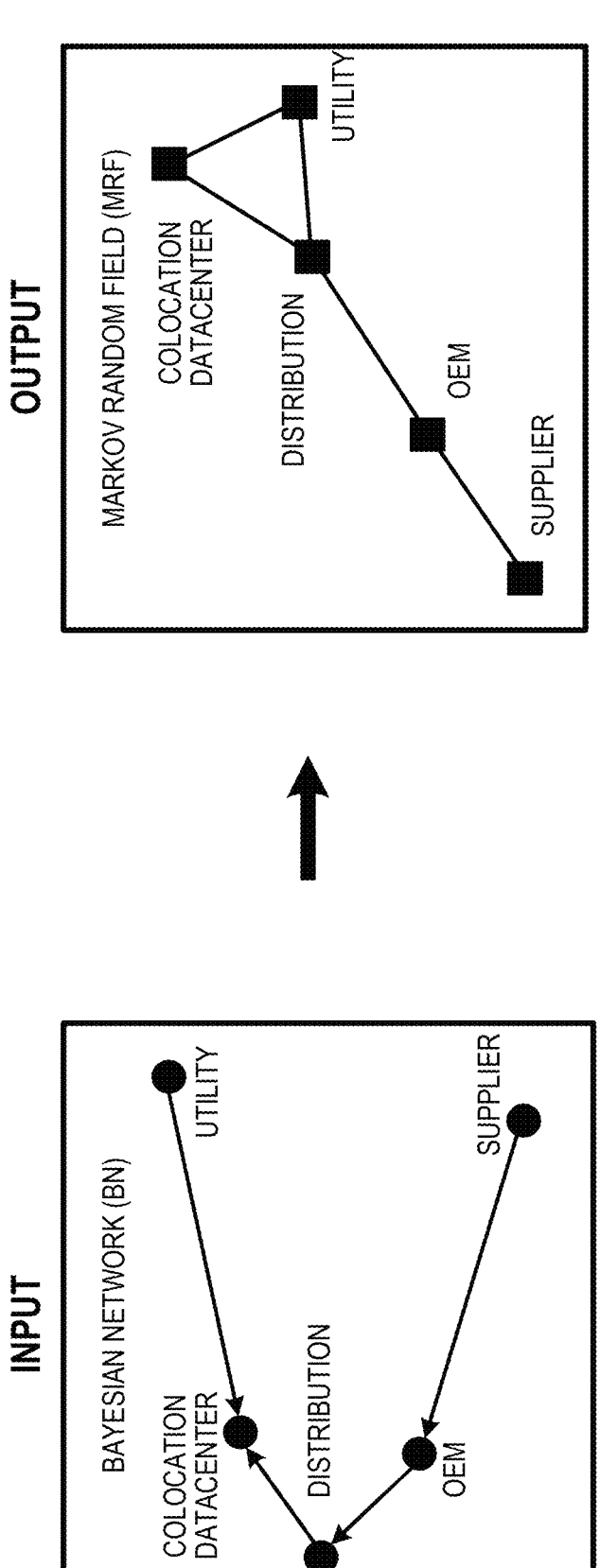
FIG. 5 depicts an exemplary input to output transformation for an exemplary network, according to various embodiments of the present disclosure.

The AI agent may further define potential functions for the nodes and edges in the graph. These functions may quantify the desirability or utility of different configurations of the random variables, reflecting the preferences or objectives of the decision-making process. This distribution may be time-dependent to reflect the dynamic nature of network, such as dynamic demand expression, power cost, etc. FIG. 5 depicts an exemplary input-to-output transformation for an exemplary Bayesian network, according to various embodiments of the present disclosure. Depicted is a use case for network construction for inventory redistribution. The input comprises a list of data center locations and current inventory levels of critical components at each location. The output comprises a comprehensive inventory of all critical components across the data centers.

In embodiments, the potential function for MRF may be defined as a function of the inventory levels at each datacenter and the costs associated with moving inventory between datacenters as follows:

$$\psi_c(x_c)=\exp(-\alpha \text{Cost}(x_c)-\beta \cdot \text{Unmetdemand}(x_c))-\gamma \text{Excessive Inventory}(x_c)$$

where $x_c$ is the set of random variables in clique c, representing the inventory levels at each datacenter; Cost$(x_c)$ represents the transportation cost associated with the current configuration of inventory levels; Unmetdemand$(x_c)$ represents the penalty for unmet demand at each datacenter; Excessive Inventory$(x_c)$ represents the penalty for excess inventory that exceeds storage capacity or incurs additional holding costs; and $\alpha$, $\beta$, $\gamma$ are weight parameters that balance the importance of each term in the potential function.

An MRF is defined over an undirected graph G=(V, E) where V is the set of nodes representing network variables (entities) and E is the set of edges representing dependencies between the network entities. The joint probability distribution of set of inventory network entities X=(X_v) where v∈ V can be expressed as:

$$P(X = x) = \frac{1}{Z} \prod_{C \in cl(G)} \emptyset_c(x_c)$$

Z is the partition function, ensuring the distribution sums to 1:

$$Z = \sum_{x} \prod_{C \in cl(G)} \emptyset_c(x_c)$$

$\emptyset_c(x_c)$ are the clique potentials, functions defined over the cliques C of the graph, capturing the interactions between the variables within each clique.

Game Theory Formulation

Game theoretic approach is used for decision-making in environments with uncertainty. It extends the Minimax algorithm by incorporating chance nodes. The expected utility at a chance node is calculated as the weighted average of the utilities of its successor nodes:

For a chance node s:

$$expValues(s) = \sum_{s' \in successors(s)} P(s \to s') \cdot values(s')$$

where P (s→s') is the probability of transitioning from node "s" to successor node "s'," and values (s') is the utility value of the successor node.

Game Theory Approach Solving MRF

The Expectimax algorithm is used to evaluate decision paths by considering both deterministic and probabilistic outcomes. The mathematical formulation involves:

Decision Nodes: At decision nodes, the algorithm selects the action that maximizes the expected utility. Mathematically, for a decision node s:

$$\text{value}(s) = \max_{a \in actions(s)} \sum_{s'} P(s' \mid s, a) \cdot \text{utility}(s')$$

Here P(s|s, a) is the probability of reaching state s' from state "s" by taking action "a" and utility (s') is the utility of state s'.

Chance Nodes: At chance nodes the expected utility is calculated as the weighted average of the utilities of successor nodes:

$$\text{value}(s) = \sum_{s'} P(s' \mid s) \cdot \text{utility}(s')$$

The formulation accounts for the probabilistic nature of the outcomes at chance nodes, where P(s'|s) is the probability of transitioning to the state s'.

Calculating Expected Utilities

The expected utility for a given decision path is the sum of the utilities of all possible outcomes, weighted by their probabilities. This involves:

Utility Calculation: For each outcome, the utility based on the specific criteria of the supply chain, such as cost, time, and reliability are calculated as separate outcome.

Probability Weighting: probabilities to each outcome is assigned based Markov Random Fields.

The overall expected utility for a decision path is expressed as:

$$\text{Expected Utility} = \sum_{i} P_i U_i$$

where $P_i$ is the probability of outcome i, and $U_i$ is the utility of outcome i.

At decision nodes, the objective is to maximize the expected utility. The utility function $U(x_c)$ is evaluates using:

$$U(xc) = -(\alpha \cdot \text{Cost}(xc) + \beta \cdot \text{UnmetDemand}(xc) + \gamma \cdot \text{ExcessiveInventory}(xc))$$

At chance nodes, calculate the expected utility by considering the probabilities derived from the MRF:

$$\text{Expected Utility}(s) = xc \Sigma P(xc) \cdot U(xc)$$

where P(xc) is the probability of the inventory configuration xc, as determined by the MRF.

Optimizing for Dependability

To optimize for dependability, the goal is to select decision paths that maximize the expected utility while minimizing risks. Example implementation Objective Function: The optimization problem is to find the inventory configuration that maximizes the expected utility across all decision paths:

$$\max_x \sum_{c \in cl(G)} \sum_{x_c} P(x_c) U(x_c).$$

Constraints: Include any constraints relevant to the supply chain, such as capacity limits or minimum service levels.

Finally, the outcome provides details including

Risk Assessment: Evaluate the risks associated with each decision path, considering factors like supplier reliability and transportation delays.

Policy Selection: Choose policies that maximize expected utility and enhance the resilience of the supply chain network.

The optimization problem can be formulated as:

$$\max_\pi \sum_{s} \sum_{a} \pi(s, a) \cdot \sum_{s'} P(s' \mid s, a) \cdot (R(s, a, s') + \gamma V(s'))$$

where π(s, a) is the policy, representing the probability of taking action "a" in state "s," R(s, a, s') is the reward for transitions from state "s" to "s'" via action "a," and γ is the discount factor representing the importance of future rewards.

In embodiments, the AI agent may use GRL to learn the embeddings of the nodes in a supply chain network, capturing the complex relationships and interactions between them. The potential functions may be updated as new data comes in, allowing the model to adapt to changes in the pattern. Graph reasoning may then be applied to these embeddings to predict the outcomes of different decisions and to define the potential functions. Using the defined choice nodes, decision nodes, random variables, and potential functions, the AI agent may perform an inference step to determine the optimal decisions. This may involve using algorithms such as belief propagation or graph cuts to compute marginal distributions or the MAP configuration.

In embodiments, the AI agent may perform inference on the graph to determine optimal decisions using algorithms such as belief propagation or other optimization techniques to find the configuration of random variables that maximizes the overall utility or minimizes risk. Finally, since the complexity of inference algorithms often scales with the size of the graph, especially for large graphs, optimization may involve graph pruning to manage complexity effectively.

In the context of planning for resilience and recovery, embodiments herein may comprise evaluating different strategies for restoration and community resilience. One major objective is to select strategies that minimize the expected impact of disruptions and optimize the restoration process. Therefore, in embodiments, an expectation calculation step may be performed to calculate the expected utility of chance nodes in an MRF the expected impact of probabilistic events on supply chain performance.

Figure 6:
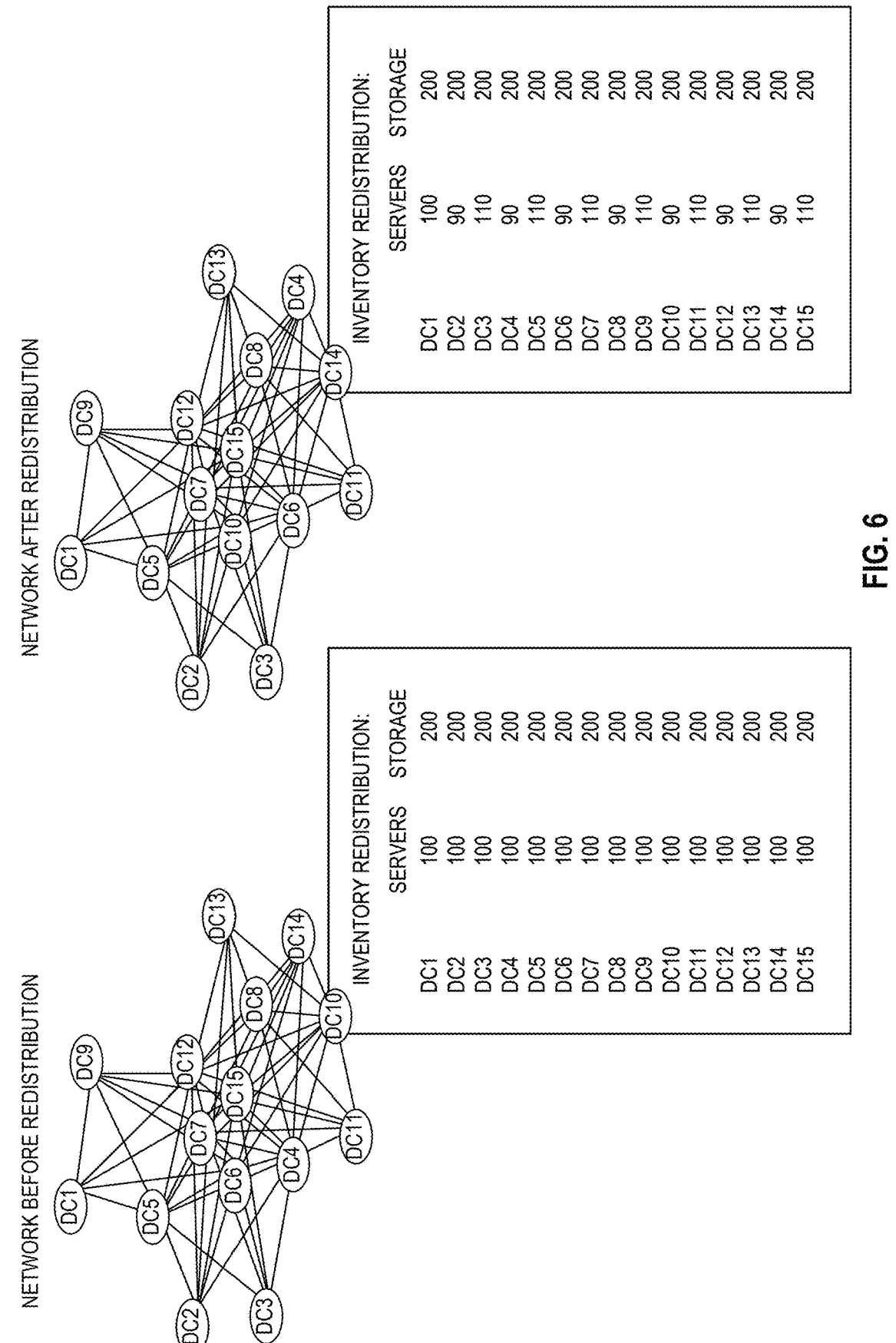
FIG. 6 depicts a redistribution inference result for an exemplary network, according to various embodiments of the present disclosure.

Then, the AI agent infers the optimal inventory levels at each location based on current demand estimates. This may involve computing the marginal distributions of inventory levels or finding the most probable configuration of inventory levels across the network. In embodiments, to minimize worst-case scenarios, candidate subgraphs may be selected based on the decisions that minimize the worst-case impact on the supply chain, such as choosing the most reliable suppliers or the most robust transportation routes. This is similar to the minimax principle, which aims to find configurations that minimize some form of cost or maximize utility under uncertainty. The objective is to identify the most probable state of the network, or the Maximum a Posteriori (MAP) state, minimizing the "loss" due to incorrect configurations. FIG. 6 depicts a redistribution inference result for an exemplary network 602, according to various embodiments of the present disclosure.

In embodiments, an AI agent may derive a set of objective functions for the complex system expressed as network based on the user query, if available. In the absence of user-defined parameters, the system may abstract this information from the operational documents or objectives, which may serve as default values (e.g., inventory level service completion time within three months for new orders from hyperscalers, and cost overshoot for the operational year within a predetermined dollar amount). This defines network recovery objectives typically in three formats (1) recovery cost, (2) recovery time, and (3) recovery point or network performance level for the selected configuration.

Various embodiments may execute multi-objective optimization methods, such as genetic algorithm, to optimize over the three recovery objectives (minimize recovery cost and time and maximize performance level). The optimal solution set may be plotted over Pareto chart and the Pareto front may provide the candidates for selection.

Ideally, execution of potential functions defined in the previous steps provides the optimal solution. However, depending on the operational constraint and alignment with business requirements, a next level of optimization is performed from the ranked list of previous candidates. Further, the AI agent may be integrated with domain-specific systems that manage the supply chain or infrastructure data. Such integration allows the AI agent to access real-time data, update the graph model, and provide actionable insights.

It is understood that the AI agent may continuously update the graph model and its parameters based on new data and feedback from outcomes of previous decisions. Advantageous, this enables the AI to adapt to changes in the network and improve its decision-making over time. FIG. 7 depicts a sample recovery network recommended by an exemplary network, according to various embodiments of the present disclosure.

Advantageously, systems and methods herein can automatically generate possible combinations of risk expressions given only a high-level description of the risk scenario, without prior information on the risk condition. Further, possible combinations of risk expressions may be automatically generated, given only a high-level description of the risk scenario without prior information on the risk condition. Furthermore, embodiments may be optimized to scale to large networked systems.

FIG. 8 is a flowchart illustrating an initialization phase of an exemplary process for dynamically generating countermeasures for complex networked systems in accordance with various embodiments of the present disclosure. In embodiments, process 800 commences at step 802, when, in an initialization phase, in response to receiving a user query at an LLM, AI agents are generated that each is defined by a task that is derived from the user query. Each AI agent may autonomously or semi-autonomously interact with an environment.

At step 804, in response to receiving a network and a user input, data related to entities and relationships in the network may be parsed such as to define nodes and edges of a graph representing the network. Nodes typically represent random variables associated with the state of entities within the network, such as whether a supplier is operational or disrupted. Edges represent the dependencies or relationships between these entities.

At step 806, a model of the network is transformed to an MRF format and a graph representation learning is applied to obtain embeddings that capture structural and relational information within the network.

At step 808, random variables are assigned to choice nodes that represent decision points in the network. The random variables represent decision options associated with the decision points.

At step 810, random variables are assigned to decision nodes that represent outcomes of the decision options. The random variables represent possible outcomes or probabilities of the possible outcomes.

At step 812, for the nodes and edges, potential functions are defined that quantify a desirability or utility of different configurations of one or more random variables and reflect preferences or objectives in a decision-making process.

At step 814, in response to receiving new data, the potential functions are updated to enable the graph to adapt to a change in a network of systems.

At step 816, the embeddings are used to predict decision outcomes and define updated potential functions.

FIG. 9 is a flowchart illustrating an inference phase of an exemplary process for dynamically generating countermeasures for complex networked systems in accordance with various embodiments of the present disclosure. In embodiments, process 900 may begin at step 902, when at least some of the choice nodes, decision nodes, random variables, or potential functions are used to determine an optimal decision.

At step 904, a configuration of random variables that maximizes a utility or minimizes a cost is ascertained.

At step 906, an expected utility of chance nodes in the MRF is calculated to assess an impact of probabilistic events on a performance of the network.

At step 908, candidate subgraphs are selected from the network. The AI agent computes a marginal distribution at each node and applies an objective inference to each subgraph.

At step 910, based on the user query, parameters are generated and a multi-objective optimization process is applied to the candidate subgraphs to select a subgraph.

At step 910, the LLM is used to output a result based on the selected subgraph.

One skilled in the art shall recognize that herein: (1) certain steps may optionally be performed; (2) steps may not be limited to the specific order set forth herein; (3) certain steps may be performed in different orders; and (4) certain steps may be done concurrently.

It is noted that although the invention is generally described in the context of supply chain networks, it is understood that this is not intended to limit the scope of the present disclosure to such embodiments as the systems and methods for dynamically generating countermeasures for complex networked systems described herein may be used in any other environment.

Figure 10:
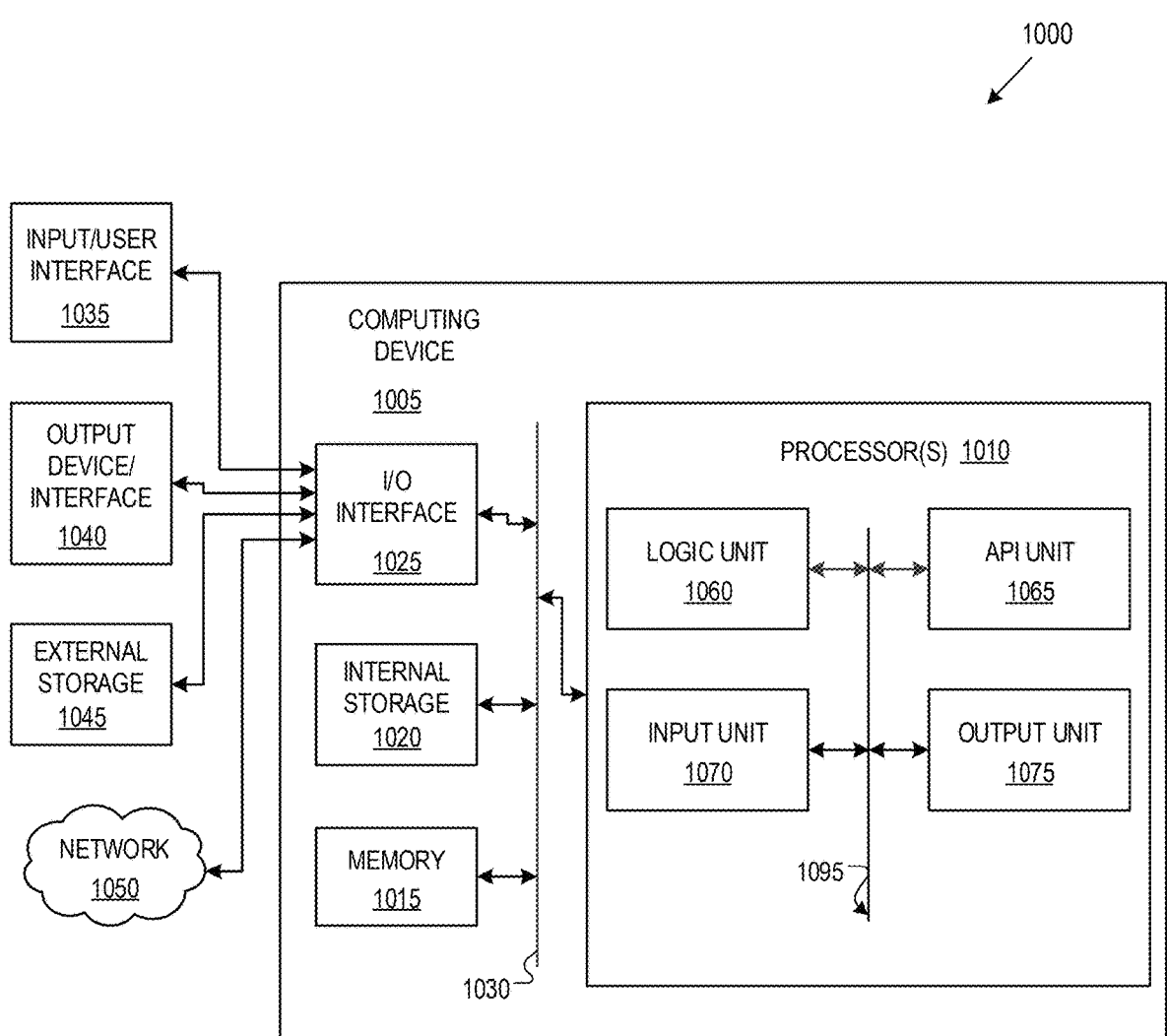
FIG. 10 illustrates an example computing environment with an example computer device according to various embodiments of the present disclosure.

FIG. 10 illustrates an example computing environment with an example computer device suitable for use in some example implementations. Computer device 1005 in computing environment 1000 can include one or more processing units, cores, or processors 1010, memory 1015 (e.g., RAM, ROM, and/or the like), internal storage 1020 (e.g., magnetic, optical, solid-state storage, and/or organic), and/or I/O interface 1025, any of which can be coupled on a communication mechanism or bus 1030 for communicating information or embedded in the computer device 1005. I/O interface 1025 is also configured to receive images from cameras or provide images to projectors or displays, depending on the desired implementation.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configurations. Computer device 1005 or any connected computer device can be functioning as, providing services of, or referred to as a server, client, thin server, general machine, special-purpose machine, or another label.

I/O interface 1025 can include wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, a satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 10105 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, and output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

Processor(s) 1010 can be configured to execute a method or computer instructions which can involve, XX as described, for example, with respect to FIG. XX Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities to achieve a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a computer-readable storage medium or a computer-readable signal medium. A computer-readable storage medium may involve tangible mediums such as optical disks, magnetic disks, read-only memories, random access memories, solid-state devices, drives, or any other types of tangible or non-transitory media suitable for storing electronic information. A computer-readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for dynamically generating countermeasures for complex networked systems, the method comprising:

in an initialization phase, in response to receiving a user query at a large language model (LLM), generating AI agents each defined by a task derived from the user query, wherein each AI agent autonomously or semi-autonomously interacts with an environment by performing steps comprising:

in response to receiving a network and a user input, parsing data related to entities and relationships in the network to define nodes and edges of a graph representing the network;

transforming a model of the network to a Markov random field (MRF) format;

applying graph representation learning to obtain embeddings that capture structural and relational information within the network;

assigning to choice nodes, which represent decision points in the network, random variables that represent decision options associated with the decision points;

18 assigning to decision nodes, which represent outcomes of the decision options, random variables that represent possible outcomes or probabilities of the possible outcomes;

for the nodes and edges, defining potential functions, which quantify a desirability or utility of different configurations of one or more random variables and reflect preferences or objectives in a decision-making process;

in response to receiving new data, updating the potential functions to enable the graph to adapt to a change in a network of systems;

using the embeddings to predict decision outcomes and define updated potential functions;

in an inference operation, performing steps comprising:

using the at least some of the choice nodes, decision nodes, random variables, or potential functions to determine an optimal decision;

finding a configuration of random variables that maximizes a utility or minimizes a cost;

calculating an expected utility of chance nodes in the MRF to assess an impact of probabilistic events on a performance of the network;

selecting candidate subgraphs from the network, wherein at least one AI agent computes a marginal distribution at each node and applying an objective inference to each subgraph; and based on the user query, generating parameters and applying a multi-objective optimization process to the candidate subgraphs to select a subgraph; and using the LLM to output a result based on the selected subgraph.

2. The method of claim 1, further comprising performing at least one or a what-if risk analysis or a risk condition simulation.

3. The method of claim 1, further comprising fine-tuning a model of the network that represents a physical network and using the network to customize an interpreter based on system-specific documents and data sources.

4. The method of claim 3, further comprising using sensor data to update the network model.

5. The method of claim 1, further comprising using at least one of a graph pruning technique to reduce a complexity of one or more graphs, a restoration optimizing technique, or a community resilience technique.

6. The method of claim 1, further comprising using one or more predefined task-based AI agents to automatically construct a joint probability distribution over the random variables in the network, the joint probability distribution being time-dependent and reflecting a dynamic network condition.

7. The method of claim 1, wherein the parameters comprise at least one of a cost or a time associated with inventory levels at different locations, the parameters being based on current demand estimates.

8. The method of claim 1, wherein the initialization phase further comprises at least one of validating a task completion and logging execution steps.

9. The method of claim 1, further comprising generating a set of recovery objectives associated with at least one of a cost, a time, or a system-based parameter.

10. The method of claim 1, wherein the embeddings capture temporal changes in the network.

11. The method of claim 1, wherein the potential functions are associated with both deterministic and probabilistic risk factors.

12. The method of claim 1, further comprising using an objective optimization process to select an optimal solution from a multi-objective optimization.

13. The method of claim 1, wherein the AI agent uses historical data to assign probabilities to random variables.

14. The method of claim 1, further comprising updating the graph based on the new data to enable continuous learning and adaptation.

15. The method of claim 1, further comprising integrating with a domain-specific system to enable a real-time data update.

16. The method of claim 1, wherein the system generates a candidate recovery network for at least one of a deterministic risk scenario or a probabilistic risk scenario.

17. The method according to claim 1, wherein the MRF is defined as:

$$\psi_c(x_c) = \exp(-\alpha \text{Cost}(x_c) - \beta \cdot \text{Unmetdemand}(x_c)) - \gamma \text{Excessive Inventory}(x_c)$$

wherein $x_c$ is a set of random variables in clique c, representing inventory levels datacenters; $\text{Cost}(x)_c$ represents a transportation cost associated with a current configuration of inventory levels; Unmetdemand ($x_c$) represents a penalty for unmet demand at each datacenter; Excessive Inventory($x_c$) represents a penalty for excess inventory that exceeds storage capacity or incurs additional holding costs; and $\alpha$, $\beta$, $\gamma$ are weight parameters that balance an importance of each term in the potential function.

18. A non-transitory computer-readable medium for storing instructions for executing a process, the instructions comprising:

in an initialization phase, in response to receiving a user query at a large language model (LLM), generating AI agents each defined by a task derived from the user query, wherein each AI agent autonomously or semi-autonomously interacts with an environment by performing steps comprising:

in response to receiving a network and a user input, parsing data related to entities and relationships in the network to define nodes and edges of a graph representing the network;

transforming a model of the network to a Markov random field (MRF) format;

applying graph representation learning to obtain embeddings that capture structural and relational information within the network;

assigning to choice nodes, which represent decision points in the network, random variables that represent decision options associated with the decision points;

assigning to decision nodes, which represent outcomes of the decision options, random variables that represent possible outcomes or probabilities of the possible outcomes;

for the nodes and edges, defining potential functions, which quantify a desirability or utility of different configurations of one or more random variables and reflect preferences or objectives in a decision-making process;

in response to receiving new data, updating the potential functions to enable the graph to adapt to a change in a network of systems;

using the embeddings to predict decision outcomes and define updated potential functions;

in an inference operation, performing steps comprising:

using the at least some of the choice nodes, decision nodes, random variables, or potential functions to determine an optimal decision;

finding a configuration of random variables that maximizes a utility or minimizes a cost;

calculating an expected utility of chance nodes in the MRF to assess an impact of probabilistic events on a performance of the network;

selecting candidate subgraphs from the network, wherein at least one AI agent computes a marginal distribution at each node and applying an objective inference to each subgraph; and based on the user query, generating parameters and applying a multi-objective optimization process to the candidate subgraphs to select a subgraph; and using the LLM to output a result based on the selected subgraph.

19. An apparatus, comprising:

one or more processors, configured to:

in an initialization phase, in response to receiving a user query at a large language model (LLM), generate AI agents each defined by a task derived from the user query, wherein each AI agent autonomously or semi-autonomously interacts with an environment and performs steps comprising:

in response to receiving a network and a user input, parsing data related to entities and relationships in the network to define nodes and edges of a graph representing the network;

transforming a model of the network to a Markov random field (MRF) format;

applying graph representation learning to obtain embeddings that capture structural and relational information within the network;

assigning to choice nodes, which represent decision points in the network, random variables that represent decision options associated with the decision points;

assigning to decision nodes, which represent outcomes of the decision options, random variables that represent possible outcomes or probabilities of the possible outcomes;

for the nodes and edges, defining potential functions, which quantify a desirability or utility of different configurations of one or more random variables and reflect preferences or objectives in a decision-making process;

in response to receiving new data, updating the potential functions to enable the graph to adapt to a change in a network of systems;

using the embeddings to predict decision outcomes and define updated potential functions; and in an inference operation, perform steps comprising:

using the at least some of the choice nodes, decision nodes, random variables, or potential functions to determine an optimal decision;

finding a configuration of random variables that maximizes a utility or minimizes a cost;

calculating an expected utility of chance nodes in the MRF to assess an impact of probabilistic events on a performance of the network;

selecting candidate subgraphs from the network, wherein at least one AI agent computes a marginal distribution at each node and applying an objective inference to each subgraph; and based on the user query, generating parameters and applying a multi-objective optimization process to the candidate subgraphs to select a subgraph; and using the LLM to output a result based on the selected subgraph.

\* \* \* \* \*